May 15, 1956  H. A. COURAND  2,745,684
ROTARY STEAM JOINT AND LOOSE MOUNTING THEREFOR
Filed March 29, 1952
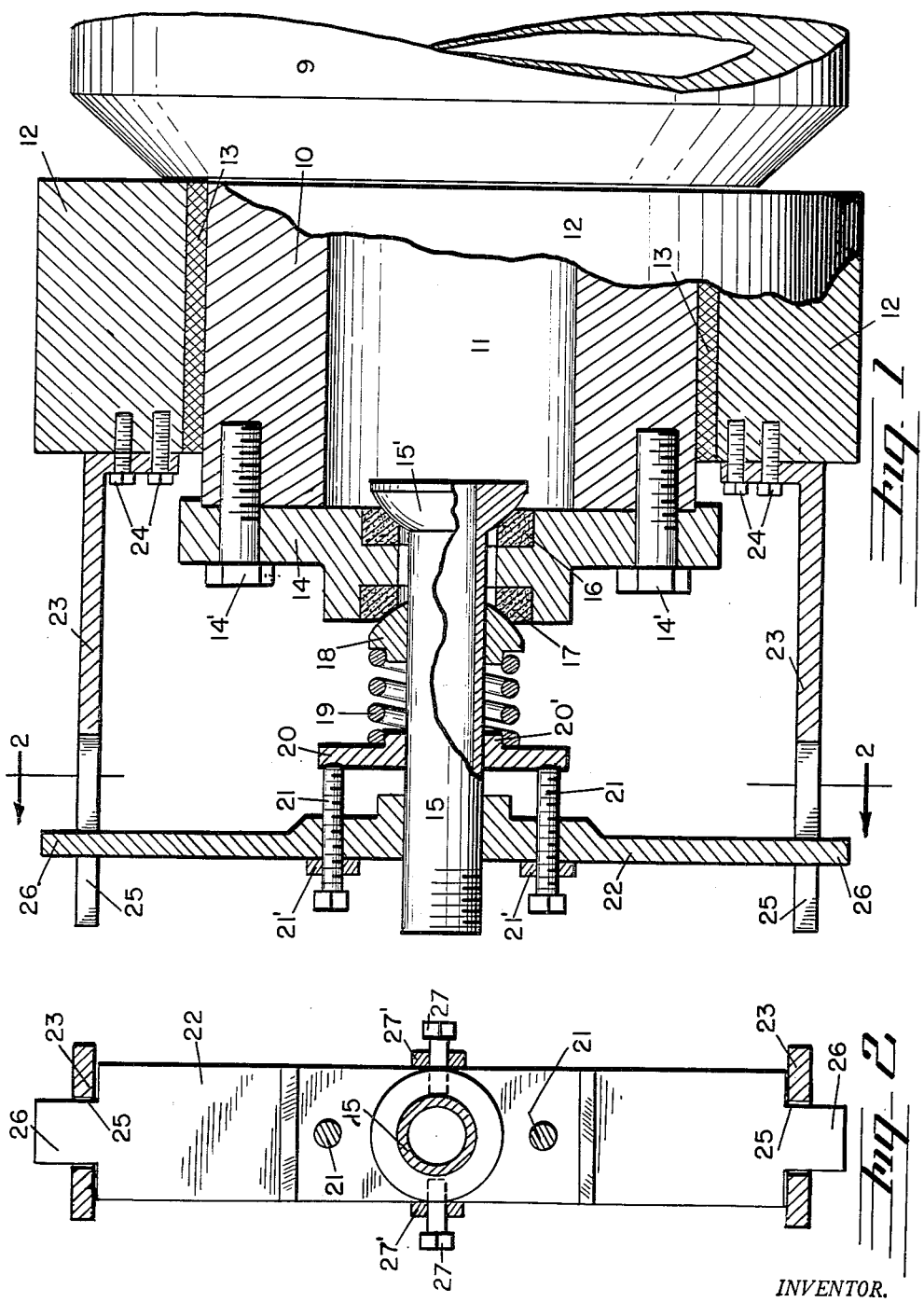
INVENTOR.
HENRY A. COURAND
BY
*L. A. Geisler.*
ATTORNEY

United States Patent Office 2,745,684
Patented May 15, 1956

2,745,684

ROTARY STEAM JOINT AND LOOSE MOUNTING THEREFOR

Henry A. Courand, West Linn, Oreg., assignor to Crown Zellerbach Corporation, San Francisco, Calif., a corporation of Nevada Application March 29, 1952, Serial No. 279,429

2 Claims. (Cl. 285—96.1)

This invention relates in general to joints adapted to form a leak-proof connection between a hollow rotating member and a hollow non-rotating member, and relates more specifically to a steam pipe joint connection through the medium of which steam is delivered from a non-rotating supply pipe into a rotating drum, hollow roller, or the like.

In particular the present invention relates to a steam joint connection adapted specially for use with steam heated rolls, such as calender rolls employed in the manufacture of paper.

In modern forms of rotary joints of the type above indicated it is customary to employ carbon-graphite wearing or sealing rings and, when properly mounted, such rings are very satisfactory for maintaining a tight seal joint and in withstanding ordinary wear. However such sealing rings are easily fractured when subjected to uneven strain or stresses or excessive vibration, and such fracturing of the rings causes leakage of steam and necessitates replacement. Since these rings are somewhat expensive the necessity for relatively frequent replacement is one of the problems heretofore presented by rotary steam joints in which they are used.

An object of the present invention is to provide an improved rotary steam joint in which there will be less likelihood of fracture of such wearing rings occurring.

I have found that where the rotary joint is located at a spaced distance from the end of the rotating roll into which the steam is delivered, the fracture of such wearing rings is more apt to occur than when the joint is positioned in the rotating roll itself, for example, when positioned in the journal end of the roll. This is due in part to the fact that the weight of the joint is then carried by the roll instead of by some stationary external support and also to the fact that there is less strain and stress on the joint elements than when these are located externally at a spaced distance.

A further object of this invention accordingly is to provide an improved rotary steam joint which will be located in the journal end of the rotating steam heated roll.

A related object is to provide a rotary joint in which the bulk of the weight of the members and associated members of the joint assembly will be carried by the roll, with the balance maintained by the roll support close to the adjacent end of the roll.

An additional object of the invention is to provide an improved rotary joint in which any rigid connection between the roll itself and the discharging end of the pipe with which the steam is delivered into the roll will be avoided.

A further object of the invention is to provide a rotary joint embodying sealing wearing rings in which the sealing pressure or tension on the rings can be adjusted easily to compensate for the wear of the rings.

Another object is to provide a rotary joint in which this adjustment of the tension on the wearing rings can be made without the dismantling of the joint and without even stopping the rotating of the roll.

I attain these objects and other incidental advantages, which will become apparent in the course of the following description and explanation, by making, arranging and mounting my improved rotary steam joint as briefly described with reference to the accompanying drawings, in which:

Fig. 1 is a fragmentary plan section of the journal end of a rotating steam heated roll showing my improved steam joint mounted in the same; and Fig. 2 is a sectional elevation taken on line 2—2 of Fig. 1.

In Fig. 1 a steam heated roll 9, such as a calendar roll in a paper machine, has a journal portion or end 10 provided with the usual axial channel 11 for the passage of steam into the main body of the roll. This journal end of the roll is rotatably mounted in a support 12 provided with a suitable bushing 13. An end plate 14 is secured to the journal portion 10 of the roll 9 by the screws 14'. Steam is delivered into the roll through a substantially stationary steam pipe 15 which extends through a central opening in the plate 14. The plate 14 has a pair of annular recesses on opposite faces respectively, surrounding the central opening through the plate, and these recesses accommodate a pair of sealing wearing rings 16 and 17 located on the inside and outside of the end plate 14 respectively. These sealing wearing rings may be of any suitable material, but I consider carbon-graphite, previously mentioned, to be the preferable material for these rings.

The inner end of the pipe 15 is formed with an integral collar 15' having the shape of a spherical segment, and thus presenting a convex spherical surface to be sealing wearing ring 16. A thrust collar 18, slidably mounted on the pipe 15, has a similar convex spherical surface in contact with the other outer sealing ring 17. A spring 19, located on the outside of the pipe 15 and held under compression between the thrust collar 18 and a spring-tensioning plate 20, holds the thrust collar 18 against the ring 17 with the desired bearing contact.

The pipe 15 extends through a central opening in a supporting plate 22. This supporting plate 22 is slidably mounted on a pair of bracket arms 23 which are secured to opposite sides of the roll journal support 12 by the screws 24. The outer end of each bracket arm 23 has a slot 25. The end portions 26 of the supporting plate 22 are reduced in width (Fig. 2) and are slidable in the slots 25 of the bracket arms 23 respectively. Set screws 27 (Fig. 2), carried by the plate 22, engage the pipe 15 and these adjustably hold the pipe 15 in the plate 22. A lock nut 27' is provided for each set screw 27.

The spring-tensioning plate 20 is slidable on the pipe 15 and preferably is formed with an annular shoulder 20' on which one end of spring 19 is seated, the other end of the spring 19 being similarly seated on the thrust collar 18. A pair of adjusting screws 21, mounted in the plate 22, engage the spring-tensioning plate 20, as shown in Fig. 1, and thus the tension of spring 19 can be adjusted through the medium of screws 21. A lock nut 21' is provided on each adjusting screw 21. As will be apparent, the adjustment of this spring tension can be made quickly and easily at any time, even while the roll is in operation.

Since the spring 19 is mounted entirely on the outside of the steam joint and is not in contact with the steam, any rapid deterioration of the spring as a result of undue rusting is avoided. With some of the rotary steam joints heretofore employed with calender rolls and the like, tension springs for the wearing rings or for the thrust collars have been located within the joint housing and in such position are subjected to constant contact with the steam. Result has been that when ordinary springs are so employed they become quickly attacked by rust, and the replacement of such springs necessitates the dismantling of the entire joint. Also, ordinarily, when these springs have been located within the joint housing, no means for adjusting spring tension has been provided, and should adjustment in spring tension become desirable the need for adjustment would not be readily apparent.

While the steam pipe 15 is adjustably held in part by the supporting plate 22 and set screws 27, the discharging end of the pipe 15 as well as the two sealing wearing rings and the bulk of the weight of the rotary joint are carried by the end of the roll itself, all rigid connection between the steam delivery pipe and the roll is avoided. Any vibration of the roll—and some vibration of a calender roll of this type is to be expected with the rapid rotation of the roll—will not impose increased strain or stresses on the sealing rings 16 and 17, for these rings are rotated with the roll and also vibrate with the roll and thus present no attempt to resist any roll movement. At the same time, the discharging end of the steam pipe 15, or more particularly the non-rotating collars 15' and 18, also offer no appreciable resistance to the vibration of the roll and sealing rings, and the fact that both collars present convex spherical surfaces to the respective sealing rings enables any relative eccentricity of the roll position or any eccentric wear of the rings to be accommodated.

Minor modifications could be made in the particular construction illustrated within the scope of my invention and without departing from the principle of the same. For example, other means could be employed in place of brackets 23 and plate 22 for supporting the outer portion of the pipe 15 and for carrying the adjusting means for the spring-tensioning plate 20. However I prefer to use the arrangement which I have shown, and in my opinion the fact that the supporting plate 22, because of its connection with the roll mounting support 12 through the intermediary of the brackets 23, will receive to a modified degree the vibration imparted to the mounting 12 by the rotating roll, makes the outer mounting for the pipe 15 preferable to a mounting which might attempt to hold the outer portion of the pipe in an absolutely stationary or rigid position.

I claim:

1. A rotary joint of the character described including a non-rotating fluid-delivery pipe and a hollow rotating roll, a mounting for said roll, an end plate secured on said roll, a central aperture in said plate, said pipe extending through said aperture with circumferential clearance, identical annular recesses around said aperture in the inside and outside faces of said plate, a pair of identical bearing and sealing rings mounted in said recesses respectively, a collar on the inside end of said pipe having a spherical surface in bearing engagement with said inside sealing ring, a thrust collar slidably mounted on said pipe on the outside of said plate adapted for bearing engagement with said outside sealing ring and having a spherical bearing surface identical to that of said inside collar, a spring extending around the outside of said pipe and having one end engaging said thrust collar, a slidable member on said pipe engaging the other end of said spring, a supporting plate for the other end of said pipe, set screws in said supporting plate for adjustably securing said pipe in said supporting plate, brackets for said supporting plate attached to said roll mounting, said supporting plate loosely mounted in said brackets for slight movement, and spring-tensioning means carried by said supporting plate and engaging said slidable member.

2. In the rotary joint as defined in claim 1 wherein said brackets are provided with elongate slots therein extending in the direction of said pipe, and said supporting plate having ears projecting through said slots to permit relative longitudinal movement between the brackets and the supporting plate while at the same time preventing relative rotation therebetween.

References Cited in the file of this patent

UNITED STATES PATENTS

| | | |
|---|---|---|
| 921,771 | Whitlock | May 18, 1909 |
| 956,290 | Colson | Apr. 26, 1910 |
| 1,972,848 | Malkin | Sept. 4, 1934 |
| 2,121,299 | Peters | June 21, 1938 |
| 2,352,317 | Goff | June 27, 1944 |